United States Patent

[11] 3,536,076

| [72] | Inventor | Robert E. Allen, Jr., Baltimore, Md.<br>13403 Kiama Court, Laurel, Maryland 20810 |
|---|---|---|
| [21] | Appl. No. | 722,967 |
| [22] | Filed | April 22, 1968 |
| [45] | Patented | Oct. 27, 1970 |

[54] LEAK-PROOF SYRINGE-TYPE CRYOSURGICAL INSTRUMENT
10 Claims, 12 Drawing Figs.

[52] U.S. Cl. ........................................... 128/303.1
[51] Int. Cl. ........................................... A61b 17/36
[50] Field of Search ........................................... 128/303, 303.1, 400, 401; 62/49, 293

[56] References Cited
UNITED STATES PATENTS

| 3,190,081 | 6/1965 | Pytryga | 128/303.1X |
| 3,425,417 | 2/1969 | Kanbar et al. | 128/303.1 |

*Primary Examiner*—L. W. Trapp
*Attorney*—Griffin, Branigan and Kindness

ABSTRACT: A leak-proof syringe-type cryosurgical instrument. A tubular transparent inner insulating member is mounted inside of a tubular opaque outer insulating member. The outer member has an aperture so that indicia inscribed on the inner member can be read. The lower end of the inner member is closed. A thermal conducting probe having a fan-shaped inner end passes through the closed end so that the temperature inside of the instrument is conducted to the outside of the instrument. An inverted cone-shaped fish trap member having open ends extends downwardly from the upper end of the inner member into the inner member. A cryogenic fluid, such as Freon, is squirted into the upper end of the fish trap, passes through the fish trap and forms a pool at the lower end of the inner member. Air is allowed to escape during insertion of the fluid by apertures in the fish trap and the inner and outer members. The fish trap prevents the fluid from leaving the instrument when the instrument is inverted.

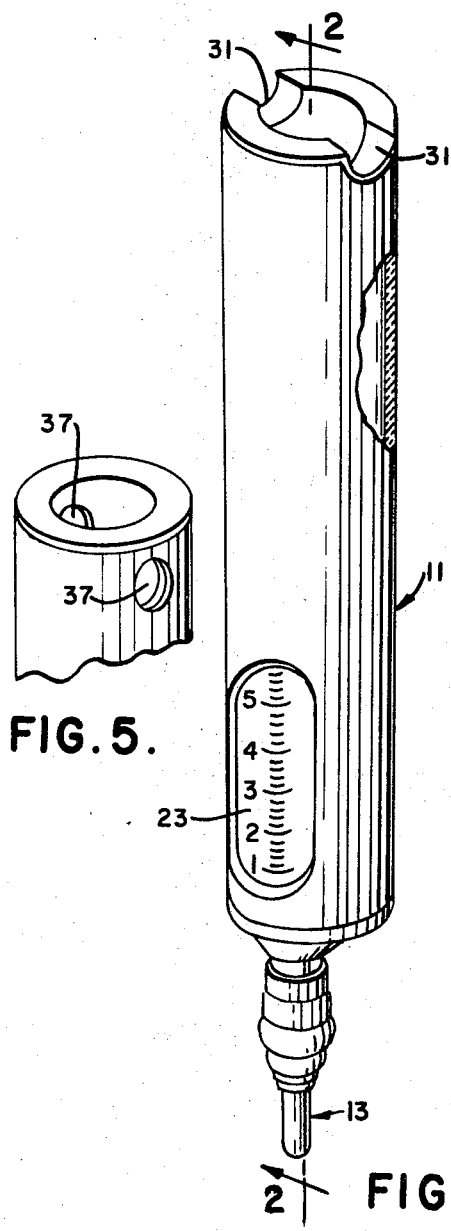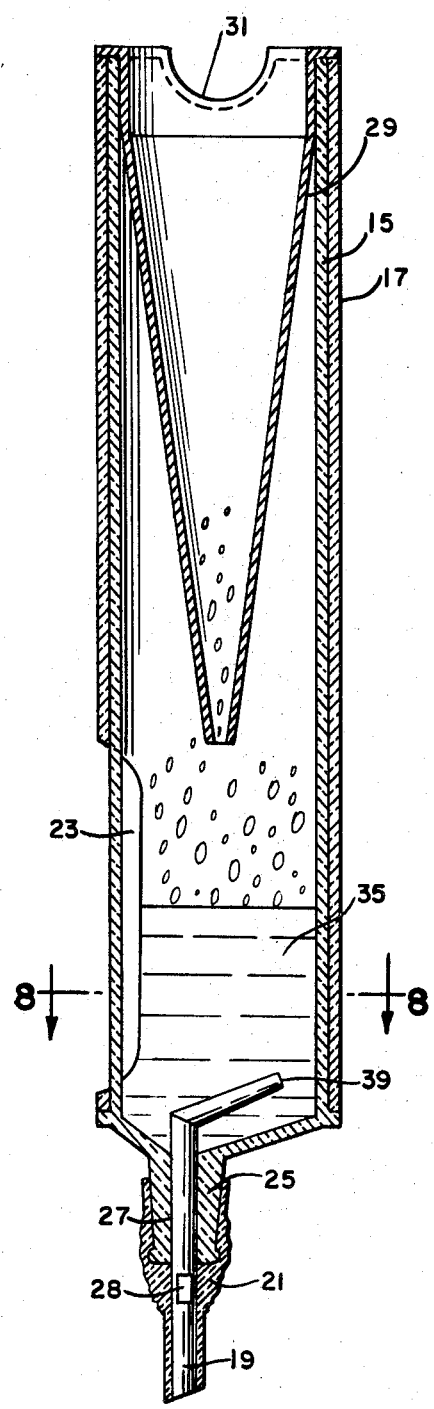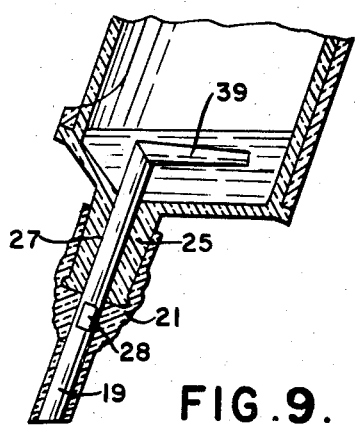

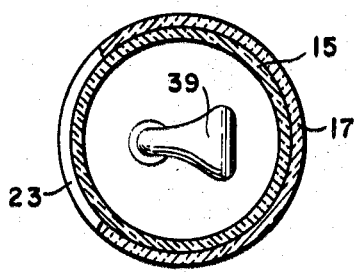
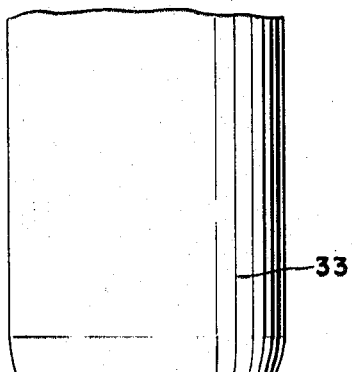
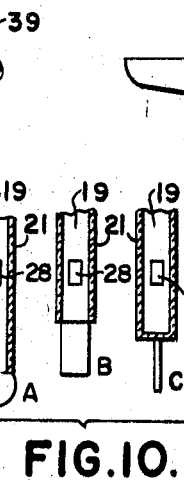
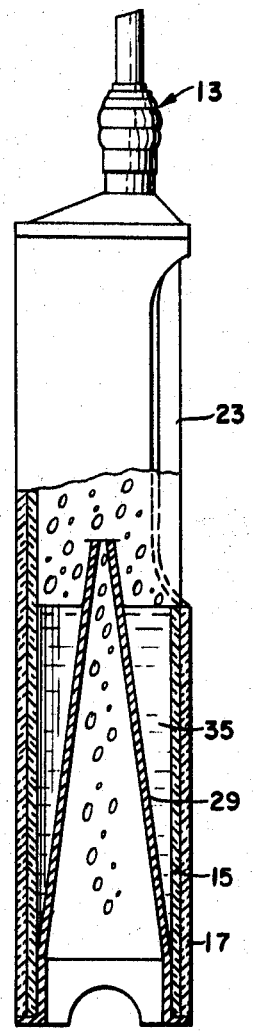
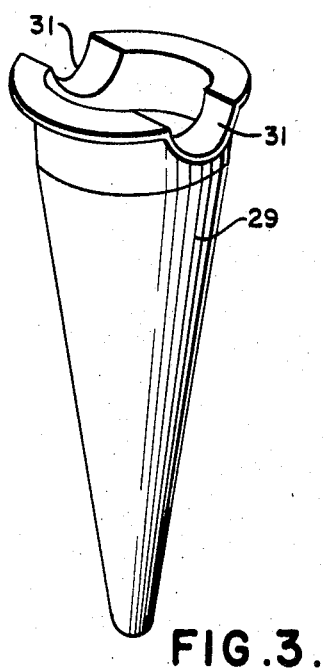
INVENTOR.
Robert E. Allen, Jr.
BY
Griffin & Branigan
ATTORNEYS

3,536,076

LEAK-PROOF SYRINGE-TYPE CRYOSURGICAL INSTRUMENT

BACKGROUND OF THE INVENTION

Cryosurgical instruments have found widespread use in recent years. These instruments generally comprise a tubular housing having a thermal conducting probe extending from one end. The probe is in contact with a cryogenic fluid held in the housing. Because the probe is thermal conducting the low temperature of the cryogenic fluid is conducted from the fluid to the tip of the probe.

Cryosurgical instruments are used in ophthalmic and other surgical environments. For example, cryosurgical probes have been used in ophthalmic surgical operations to remove cataracts and in neurosurgical operations to freeze portions of the brain. Another use of cryosurgical instruments is in gynecology cryo-treatments. Cryosurgical instruments can also be used by dermatologists to remove certain types of warts. Hence, cryosurgical instruments have widespread use in the medical and related fields.

All of the prior art cryosurgical instruments or tools have disadvantages. For example, the majority of the prior art instruments have bulky housings and complex inner workings. The bulky housing is generally a relatively large tubular structure that is difficult for a surgeon to handle; hence, the surgeon looses his ability to "feel" when performing a cryosurgical operation using these prior art instruments. In addition, because prior art instruments have complex inner workings, they are expensive. Some of the prior art cryosurgical instruments require a maze of channels for cryogenic fluid flow. The complexity of channels makes these instruments difficult to manufacture with the end result that they are expensive. Other prior art cryosurgical instruments require complex electronic wiring and/or valves to control cryogenic end effects. Some require attachments between the probe and a source of cryogenic fluid; that is, the source of cryogenic fluid is remote from the probe per se, hence, connecting lines are necessary. The addition of valves and remote sources of cryogenic fluid increases the cost of the instruments and again destroys the "feel" essential to critical surgical procedures.

From the foregoing description of prior art cryosurgical instruments, it will be appreciated that those instruments are unsuitable for widespread use for a number of reasons. Because they are complex, they are expensive thereby raising the cost of cryosurgical operations. In addition, because they are bulky, their maximum surgical utility is limited. That is, because the users must make small deft movements for many surgical operations, the instrument that is used must be adapted for small deft movements. However, prior art instruments are not so adapted because they are large and bulky or otherwise sufficiently heavy for the relative size of the instrument so as to destroy the sense of "feel".

Even the less bulky and less complex prior art cryosurgical instruments have certain disadvantages. For example, a cataract cryoextractor presently sold by Smith, Miller and Patch, Inc., and described on pages 451—454 of volume 78 of the October 1967 edition of the Archieves of Ophthamology has certain disadvantages. One disadvantage is that because it is open at one end, it is easily spilled when inverted. In addition, it is difficult to fill. Specifically, when the Smith, Miller and Patch cryoextractor is filled, a cryogenic fluid is squirted against one side of the open end of the cryoextractor. Unless precisely done, the squirting causes fluid to spray over the side of the extractor resulting in the possibility of sudden contact with the refrigerant resulting in harm to the surgeon, the patient or both.

Therefore, it is an object of this invention to provide a new and improved cryosurgical instrument.

It is also an object of this invention to provide a new and improved cryosurgical instrument that is less complex and less bulky than prior art cryosurgical instruments.

It is a further object of this invention to provide a new and improved cryosurgical instrument that is inexpensive to construct, leak-proof, insulated and easy to manipulate.

SUMMARY OF THE INVENTION

In accordance with a principal of this invention a new and improved cryosurgical instrument is provided. The instrument comprises a tubular insulated housing that is closed at one end. A thermal conducting probe extends from the closed end to form a thermal conducting member passing from the inside of the housing to the outside of the housing so that when a cryogenic fluid is held in the housing a cold probe is provided. The other end of the housing includes a means for aiding the insertion of a cryogenic fluid into the housing but preventing the loss of the fluid when the housing is inverted or otherwise moved from a vertical position.

In accordance with another principal of this invention the means for aiding the insertion of the cryogenic fluid but preventing the loss of the fluid comprises an open ended inverted cone or fish trap structure. It also includes apertures that allow gas pressure trapped in the housing to exhaust when the housing is filled with a cryogenic fluid. Because the cryogenic fluid is, preferably, vertically inserted into the fish trap structure, splashing over the sides of the housing is prevented.

In accordance with a further principal of this invention the housing comprises an inner tubular member and an outer tubular member. The inner tubular member is transparent and includes a series of indicia near its lower end. The outer tubular member is opaque and includes an aperture through which the indicia can be viewed. Preferably, both the inner and outer tubular members are formed of a highly, thermally insulative material.

In accordance with still another principal of this invention the thermal conducting member includes a fan-shaped inner end so that a large surface is in contact with the cryogenic fluid.

In accordance with yet another principal of this invention the structure (except for the probe) is formed of plastic materials that can be thermally joined together. And, the probe is fixedly held in the plastic structure by plastic flowing into indentations in the side of the probe when the plastic is heated. In addition to fixedly holding the probe a leak-proof seal is formed around the probe when the plastic is heated i.e. a shrink fit is created.

It will be appreciated from the foregoing that the invention provides a cryosurgical instrument that is less complex and less bulky than prior art devices. Preferably, the housing is in the size and shape of a comfortably held syringe, hence, a surgeon using the instrument can easily manipulate it without a loss of "feel". In addition, the invention does not require complex channels for cryogenic fluid flow. Moreover, the invention does not require complex electrical wiring or external connections to a source of cryogenic fluid. The fish trap structure aids the insertion of a cryogenic fluid while preventing the loss of the fluid when the housing is inverted or otherwise moved from the vertical. Apertures in the device allow air and gases to exhaust no matter what position the device happens to be in even while the fluid is being inserted into the device. The fluid is inserted without a hazardous build-up of gases, splashing or other detrimental occurrences. It will also be appreciated that, because the instrument is formed of plastic, it can be inexpensively manufactured in large quantities. And, because certain plastics have a high insulation effect, a well insulated device is provided.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a pictorial diagram partially in cross section illustrating the overall structure of the cryosurgical instrument of the invention;

FIG. 2 is a cross-sectional diagram along lines 2–2 of FIG. 1;

FIG. 3 is a pictorial diagram illustrating the fish trap component of the invention;

FIG. 4 is a partial pictorial diagram partially in cross section illustrating the insertion of a cryogenic fluid into the cryosurgical instrument of the invention;

FIG. 5 is a partial pictorial diagram illustrating an alternative embodiment of a portion of the invention;

FIG. 6 is a pictorial diagram partially in cross section illustrating the invention in an inverted position;

FIG. 7 is a pictorial diagram illustrating one embodiment of the probe of the invention;

FIG. 8 is a cross-sectional diagram along lines 8–8 of FIG. 2;

FIG. 9 is a partial cross-sectional diagram along lines 2–2 of FIG. 1; and

FIGS. 10A—C are diagrams illustrating alternative probe tips for use in the invention.

DESCRIPTION OF THE PREFERRED EMBODIMENT

The following description of the preferred embodiment of the invention generally describes a small hand or finger held ophthalmic-type surgical cryogenic instrument used primarily in extraction or surgical removal of diseased cataract lens from the human eye; but having certain limited applications in obstetric-gynecological soft tissue and dermatological firm tissue surgical procedures designed (1) to promote controlled and limited destruction and/or removal of diseased tissue and, thereby, (2) to prevent the destruction of normal tissue by providing the ability to vary the amount of tissue destruction with (3) safety from harmful side effects; (4) simplicity in surgical technique and (5) with protection for both surgeon and patient. It will be appreciated by those skilled in the art that, while the foregoing description describes the preferred use of the invention, the invention is also useful in other related environments.

Turning now to the drawings wherein like reference numerals designate like parts throughout the several views; FIG. 1 is a pictorial diagram illustrating the invention and comprises a housing 11 and a probe 13 extending downwardly from the housing. In general, a cryogenic fluid, such as one of the freons in a liquid state, is inserted into the upper end of the housing 11, passes through the housing and contacts the probe 13 inside of the housing. Hence, the probe tip is cooled by the cryogenic fluid.

FIG. 2 illustrates in more detail the structure of the invention. The housing 11 includes an inner tubular member 15 located inside of an outer tubular member 17. Preferably, the inner member is transparent, the outer member is opaque and both members are formed of thermally insulating plastic materials. Indicia inscribed on the lower part of the tubular surface of the inner member (FIG. 1) are viewed through an aperture 23 in the outer member. The indicia describe the relative level of the cryogenic fluid pool 35 that is inserted into the housing 11 in the manner hereinafter described.

An example of a material suitable for forming the tubular housing is the thin multilayer foil fiber laminate type insulating material presently on the market. This material is fully capable of making this invention useful, practical and safe for cryogenic surgical procedures presently possible with only the most complex and expensive electronic cryogenic equipment. This type of insulating material will protect patient and surgeon from liquid hydrogen which would reduce the temperature of the probe of this invention to a minus 400° centigrade. Hence, because the removal of diseased human eye cataract lens is normally accomplished with probe temperatures of minus 5 to minus 15° centigrade, a well insulated probe will be provided.

The probe 13 includes a thermal conducting member 19 and an insulating jacket 21. Preferably, the thermal conducting member is a solid tubular probe formed of silver or copper.

The inner member 15 is closed at its lower end and has a downwardly projecting protrusion 25. The protrusion 25 has an aperture 27 through which the thermal conducting member 19 passes. The insulating jacket 21 fits over the exposed lower end of the thermal conducting member 19 and over a portion of the protrusion 25. More specifically, the thermal conducting member 19 is insulated around its outer periphery along the portion of its length that projects outside of the housing 11 except for its lowermost end or tip face. The thermal conducting member 19 has a pair of indentations 28 on either side at a point below the end of the protrusion 25. These indentations 28 are covered by the insulating jacket 21. Hence, if the insulating jacket is formed of a malleable plastic material, it will flow into the indentations to seal and lock the thermal conducting member in a desired position. Preferably, as hereinafter described, the insulating jacket material does flow into these indentions when heated.

Also illustrated in FIG. 2 is an open ended generally cone-shaped structure 29. The cone-shaped structure or fish trap 29 fits into the open end of the housing 11 in an inverted manner. Hence, there is a large opening at the upper end of the overall structure that narrows to a small opening. The fish trap 29 changes from a cone-shape into a tubular shape at its upper end. The tubular portion of the fish trap 29 fits inside of the inside of the inner member 15. In addition, the fish trap 29 has an outwardly extending tip that extends over the edge of the inner and outer members 15 and 17. Preferably, the inner member fits snugly inside of the outer member and the fish trap fits snugly inside of the inner member. Hence, a snug, thermally insulating housing is provided.

The fish trap 29 and the inner and outer members 15 and 17 have a pair of semicircular apertures 31. The semicircular apertures 31 have the same axis and that axis is at right angles to the longitudinal axis of the housing.

As illustrated in FIG. 4, the semicircular apertures 31 allow air to escape from the housing when freon or any other suitable cryogenic fluid is inserted into the top of the fish trap 29. More specifically, because the preferred size of the tubular structure is small (generally about the size of a comfortably held syringe), the nozzle of a source of cryogenic fluid may, as illustrated in FIG. 4, fill the open upper end of the fish trap. When this happens, air is trapped causing internal pressure. In addition, the usual source of fluid is an aerosol can wherein the fluid is under pressure. Moreover, the cryogenic fluid starts to change to a gas state upon release from the aerosol can. This change also adds to the gas pressure. Hence, a tremendous internal pressure is created if a means for releasing the pressure is not provided. The means is provided by the semicircular apertures 31.

To be still more specific, FIG. 4 illustrates an aerosol can 33 filled with a cryogenic fluid under pressure. When the nozzle of the can is inserted into the top of the fish trap 29 and the nozzle is pressed against the top of the fish trap, a cryogenic fluid is emitted from the nozzle. Without the semicircular apertures 31, the top of the fish trap would be entirely closed causing the above described pressure condition. Hence, it will be appreciated that because prior art devices do not have semicircular apertures 31, the nozzle of the cryogenic container 33 cannot be directly pressed against the top of the structures. If this is done, gas pressure forms inside of the structure forcing the can nozzle away from the structure resulting in splashing which may cause injury to the surgeon or his patient. This then is the reason that devices such as the Smith, Miller and Patch, Inc., a device hereinabove described squirts the fluid at an angle against the wall of the housing thereby making that device undesirable.

The fluid from the aerosol can passes through the lower opening in the fish trap and forms a fluid pool 35 (FIG. 2) in the lower end of the housing 11. The level of the fluid can be viewed through the aperture 23 in the outer member. And, the indicia represent a relative indication of the amount of cryogenic fluid in the lower end of the housing.

FIG. 5 illustrates an alternative embodiment of the gas exhaust apertures of the invention. FIG. 5 illustrates circular apertures 37 located below the lip of the fish trap. The circular apertures pass through the sides of the fish trap and the inner and outer members at a point between the end of the cone portion of the fish trap and the lip of the fish trap. Gases exhaust from the housing 11 through the circular apertures 37 of FIG. 5 in the same manner that gasses exhaust through the semicircular apertures 31.

As illustrated in FIG. 6, the primary function of the fish trap 29 is to prevent the cryogenic fluid 35 from spilling out of the housing 11 when the housing is inverted. That is, when the housing is inverted the cryogenic fluid 35 fits between the outer edge of the cone portion of the fish trap 29 and the inner edge of the inner members 17. Hence, the fish trap, because it is funnel-shaped, aids the insertion of the cryogenic fluid 35 and prevents splashing. In addition, the fish trap prevents spilling when the overall structure is inverted or otherwise moved from a filling or normal near-vertical surgical-hold position.

The thermal conducting member 19 of the probe 13 has a fan-shaped inner end 39 that is best illustrated in FIGS. 6 and 7. The fan-shaped inner end 39 provides a greater surface for contact with the cryogenic fluid 35 than is provided if the end is not fan-shaped. Hence, a greater thermal conducting effect occurs.

In addition to the foregoing features, the invention has another feature. Specifically, the longitudinal axis of the thermal conducting element 19 is offset from the longitudinal axis of the housing 11. Because of this offset, the invention is more easily utilized by surgeons in cryosurgical operations. For example, when the instrument is to be used in a cataract removal operation, it is normally held between the thumb and forefinger of the surgeon. The offset between the thermal conducting element 19 and the housing 11 provides a full view of the probe and aids the surgeon in holding the instrument in the desired position. Further, it should be noted that, when the instrument is used in a cataract removal operation, it is normally held at approximately 35° from the vertical. Therefore, as illustrated in the drawings, the lower end of the thermal conducting member 19 is angulated so that when the instrument is held at 35° from the vertical position (illustrated in FIG. 9) the lower end or face of the probe is horizontal. It should also be noted that the fan-shaped end 39 of the thermal conducting member 19 is parallel with the angulated lower end of the probe. Hence, as the cryogenic fluid 35 starts to evaporate and dissipate (FIG. 9) and pass as a gas through the fish trap 29, the fan-shaped end remains in contact with the fluid until the fluid is almost exhausted.

FIGS. 10A, B, and C illustrate examples of alternative embodiments of the probe end thereby allowing the invention to be used in other than cataract removal operations. The end of the probe illustrated in FIG. 10A is cut at right angles to the longitudinal axis of the probe and the insulating jacket extends to the end of the probe. The FIG. 10A embodiment is utilized for forming ice balls at the end of the probe; that is, moisture condenses on the end of the probe and forms an ice ball. The ice balls are useful in certain environments. The FIG. 10B probe end is also cut at a right angle to the longitudinal axis of the probe. The FIG. 10B embodiment differs from the FIG. 10A embodiment because the insulating jacket 21 is undercut from the end of the thermal conducting member 19. The FIG. 10B embodiment is useful in gynecology cryo-treatments. The embodiment illustrated in FIG. 10C has an undercut extension of the normal end of the probe resulting in a very thin probe. The insulating jacket's ends at the start of the undercut. The 10C embodiment is suitable for use by dermatologists in the removal of certain types of warts. It will be appreciated that FIGS. 10A, B and C are merely exemplary of the numerous probe tips that can be utilized with the invention. Hence, they should not be considered as a limitation on the type of probe tips that can be utilized in the invention.

It will be appreciated that the foregoing description of the preferred embodiments of the invention describes a cryosurgical instrument that overcomes the problems of the prior art. The invention is not bulky as are many prior art devices; preferably, it is approximately the size of a syringe that is easily held in a surgeons hand. Hence, the surgeon does not loose his "feel" when using the instrument in a cyrosurgical operation. In addition, the invention is less complex than prior art cryosurgical instruments. It merely requires inner and outer tubular members having a probe extending from one end. These members can be formed of various thermally insulating plastics depending upon the cryogenic fluid that is to be used. That is, the thermal insulative effect of plastic materials varies as does the thermal values of cryogenic fluids, hence, the cryogenic fluid determines the plastic and/or other similar materials to be used in a particular device. Preferably, the plastic components of the structure are joined by thermal heating after they are assembled. That is, after the structure is assembled in the manner illustrated in FIG. 2, it is heated. The heat bonds the plastic elements together and bonds or shrinks the plastic elements to the thermal conducting member. Also preferably, the fish trap is considerably thinner than the inner and outer insulating members. It will be appreciated that the thermal transposing effect of a thin material in an environment similar to the environment of the fish trap is less than a thick material.

The invention overcomes the prior art problem of devices similar to the device sold by Smith, Miller and Patch and described above. Specifically, the invention instrument can be inverted without the loss of the cryogenic fluid. In addition, the cryogenic fluid is easily inserted into the device without splashing and possible injury to a surgeon or his patient. Moreover, the fan-shaped inner end of the thermal conducting member provides better thermal conductivity.

It will be appreciated that the foregoing has merely described the preferred embodiments of the invention and that various modifications can be made within the scope thereof. For example, while the structure has been described as tubular, it will be appreciated that other regular cross-sectional configurations can be utilized. Moreover, various probe tips other than those specifically described can be utilized with the invention. Finally, while the apertures allowing the emission of gases have been described and illustrated as circular and semicircular, it will be appreciated that other configurations can also be utilized. Hence, the invention can be practiced otherwise that as specifically described herein.

I claim:

1. A leak-proof syringe-type cryosurgical instrument comprising:
   a longitudinal housing for holding a cryogenic fluid at one end;
   a thermal conducting means for conduting the temperature inside of said housing to the outside of said housing, said thermal conducting means extending from one end of said housing and being in contact with said cryogenic fluid; and
   a fish trap means mounted in said housing having a large opening located at the other end of said housing and a small opening located in said housing for aiding the insertion of said cryogenic fluid while preventing said cryogenic fluid from leaving said housing after said fluid is inserted into said housing.

2. A leak-proof syringe-type cryosurgical instrument as claimed in claim 1 including at least one aperture located near the other end of said housing and the large opening of said fish trap means for exhausting gas pressure in said cryosurgical instrument when said cryogenic fluid is being inserted into said housing.

3. A leak-proof syringe-type cryosurgical instrument as claimed in claim 2 wherein said housing comprises:
   an inner transparent tubular insulating member closed at said one end, said inner member having a plurality of indicia located on one side near said one end; and
   an outer opaque tubular insulating member mounted over said inner member and having an aperture through which said indicia located on said inner member can be viewed.

4. A leak-proof syringe-type cryosurgical instrument as claimed in claim 3 wherein said thermal conducting means includes a metallic probe passing through said one end of said housing and an insulating jacket mounted over said probe and a portion of said one end of said housing.

5. A leak-proof syringe-type cryosurgical instrument as claimed in claim 4 wherein said one end of said housing includes a protrusion that extends into said insulating jacket.

6. A leak-proof syringe-type cryosurgical instrument as claimed in claim 5 wherein said fish trap means comprises a thin walled inverted cone-shaped member having a tubular end that fits inside of said inner member of said housing, said cone-shaped member having a lip that extends over the edges of said inner and outer members.

7. A leak-proof syringe-type cryosurgical instrument as claimed in claim 6 wherein the inner end of said metallic probe is fan-shaped.

8. A leak-proof syringe-type cryosurgical instrument as claimed in claim 7 wherein said aperture is semicircular and is defined by the lip of said cone-shaped member.

9. A leak-proof syringe-type cryosurgical instrument as claimed in claim 8 wherein said inner and outer housing members and said cone-shaped member are formed of plastic, said plastic being bondable when heat is applied.

10. A leak-proof syringe-type cryosurgical instrument as claimed in claim 9 wherein said metallic probe has indentations and wherein said insulating jacket is formed of plastic that is flowable into said indentations when said insulating jacket is heated.